No. 619,966. Patented Feb. 21, 1899.
N. LANSER.
NON-REFILLABLE BOTTLE.
(Application filed Oct. 22, 1896. Renewed Jan. 30, 1899.)
(No Model.)
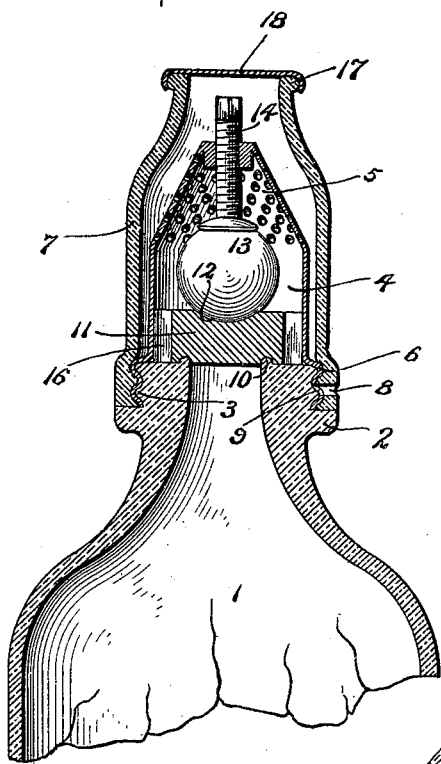
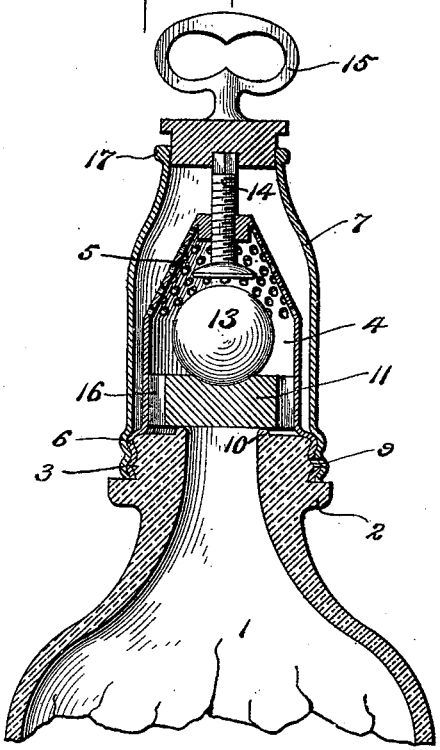
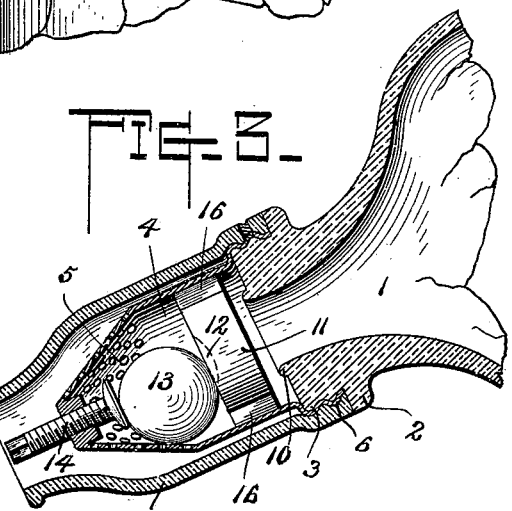
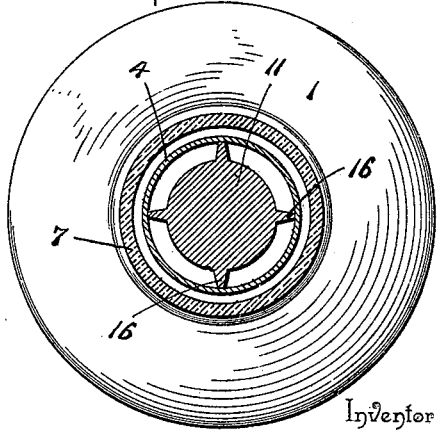
Inventor
*Nicholas Lanser,*
Witnesses
By his Attorneys,

UNITED STATES PATENT OFFICE.

NICHOLAS LANSER, OF ALLEGHENY, PENNSYLVANIA.

NON-REFILLABLE BOTTLE.

SPECIFICATION forming part of Letters Patent No. 619,966, dated February 21, 1899.

Application filed October 22, 1896. Renewed January 30, 1899. Serial No. 703,954. (No model.)

*To all whom it may concern:*

Be it known that I, NICHOLAS LANSER, a subject of the King of Belgium, residing at Allegheny, in the county of Allegheny and State of Pennsylvania, have invented a new and useful Non-Refillable Bottle, of which the following is a specification.

The present invention relates to improvements in non-refillable bottles.

The object of the present invention is to improve the construction of non-refillable bottles and to provide a simple and inexpensive one which after it has been sealed will effectually prevent the introduction of a liquid into it and thereby avoid the adulteration of its contents and prevent the fraudulent sale of a similar liquid in it after its original contents have been dispensed.

A further object of the invention is to provide a bottle which will be adapted to be readily corked without driving a cork or stopper into its neck and which will enable access to be had to its contents without subjecting the operator to the strain incident to drawing an ordinary cork.

Another object of the invention is to provide a stopper which will be especially adapted for bottles containing highly-charged liquids—such as champagne, ginger-ale, and the like—and which after the bottle is opened will prevent accidental escape and loss of the liquid and gases contained therein.

Furthermore, it is the object of the invention to provide such a stopper which may be used on bottles containing cheap liquids and which while enabling such bottles to be readily corked and uncorked will permit them to be refilled.

The invention consists in the construction and novel combination and arrangement of parts hereinafter fully described, illustrated in the accompanying drawings, and pointed out in the claims hereto appended.

In the drawings, Figure 1 is a longitudinal sectional view of a bottle constructed in accordance with this invention and shown closed. Fig. 2 is a similar view showing the position of the parts preparatory to forcing the cork on its seat. Fig. 3 is a longitudinal sectional view, the bottle being inclined for pouring out its contents. Fig. 4 is a horizontal sectional view.

Like numerals of reference designate corresponding parts in all the figures of the drawings.

1 designates a bottle provided on the exterior of its neck with an annular flange 2, forming an upper shoulder, and the neck of the bottle is provided above the same with exterior screw-threads 3, which are engaged by a valve-casing 4. The valve-casing 4, which is constructed of metal, consists of a lower cylindrical portion and an upper perforated conical portion 5, and the lower portion is provided at its bottom with screw-threads 6, formed by grooving or indenting the metal, whereby exterior and interior screw-threads are provided. The valve-casing screws on the neck of the bottle, and a shell 7, which is interiorly threaded at its lower end, screws on the threaded lower end of the valve-casing and abuts against the exterior shoulder of the neck of the bottle similar to the valve-casing. The threaded portion of the valve-casing and the shell are provided with perforations 8 and 9, which register when the parts are in position and which are adapted to receive a suitable cement, solder, or the like, which enters the threads of the bottle and securely fastens the valve-casing and the shell to the same. The sealing is employed when it is desired to provide a non-refillable bottle, and when the sealing is not employed the valve-casing and the shell may be readily removed from the bottle. This construction permits the bottle to be refilled and is designed only to be employed in the sale of the cheaper beverages and when it is designed to obtain the advantages of the corking device, hereinafter described. The shell, as illustrated in Figs. 1, 3, and 4, is constructed of glass, but, as shown in Fig. 2 of the drawings, may be made of metal, and the metal parts of the device are designed to be nickeled to prevent them from having any injurious effect on the contents of the bottle.

The neck of the bottle is provided at its upper edge with an upwardly-projecting flange 10, forming a seat for a cork or stopper 11, which is adapted, as illustrated in Fig. 1, to be compressed around the flange 10, whereby the bottle is thoroughly sealed. The cork or stopper 11 is provided in its upper face with a curved depression or concavity 12, forming a seat for a ball 13, which when the bottle is closed is forced against the cork or stopper by a screw 14. The screw 14 is mounted in a threaded opening of the top of the conical portion of the valve-casing. Its inner end is provided with a head for engaging the ball 13, and its outer end is squared or otherwise polygonal to be engaged by a key 15, which is adapted to rotate the screw sufficiently to compress the cork or stopper on its seat. The key consists of a handle and a circumferentially-rabbeted head provided in its lower face with a socket conforming to the configuration of the outer end of the screw. By slightly rotating the screw the bottle is opened or closed, and the inconvenience incident to drawing the ordinary cork is obviated.

The cork or stopper is provided with radial guide-flanges 16, extending outward from the body of the cork or stopper and fitting snugly within the cylindrical portion of the valve-casing, to enable the cork or stopper to move inward and outward without changing its central position. When the bottle is inverted below a horizontal position, as illustrated in Fig. 3 of the accompanying drawings, the ball rolls away from the cork or stopper, and the latter, through its own weight and through the pressure of the liquid, is moved outward away from its seat to permit an outward flow of the contents of the bottle, the radial guide-flanges 16 forming openings between them for the passage of the liquid. The liquid passes out through the openings at the bottom of the cork or stopper, and those openings or spaces at the top thereof serve as vents to permit air to flow into the bottle to take the place of the liquid poured therefrom. When the bottle is in a horizontal position, the cork or stopper is held on its seat to close the bottle by the ball, which is prevented from moving outward by the lower side of the conical outer portion of the valve-casing. The lower side of the conical outer portion of the casing forms an incline, which extends upward and outward when the bottle is in a horizontal position and is adapted to cause the ball to roll inward and close the bottle by forcing the stopper or cork on its seat.

In Fig. 3 of the drawings the bottle is shown sufficiently inverted to permit the ball to roll outward to open the bottle, and should the bottle be raised to a horizontal position the ball will roll inward and close the bottle. Owing to this construction the bottle cannot be partially filled by inserting it in horizontal position into a receptacle containing a liquid. The shell 7 is provided at its upper end with an exterior bead or rib 17, which is adapted to be engaged by flanges of a metal cap 18, that can be easily removed to obtain access to the screw.

It will be seen that the bottle is simple and comparatively inexpensive in construction, that it forms an effective non-refillable bottle, and that it provides an effective stopper capable of sealing or closing a bottle as effectually as the ordinary cork and adapted to enable the bottle to be readily opened without any strain on the operator.

What I claim is—

1. In a device of the class described, the combination with a bottle, a valve-casing provided at its outer end with a threaded opening and consisting of a lower cylindrical portion and an upper conical portion, a stopper or cork arranged within the cylindrical portion of the valve-casing and adapted to close the bottle, a ball interposed between the cork or stopper and the outer end of the valve-casing, a screw arranged in the threaded perforation of the valve-casing and adapted to engage the ball and hold the cork or stopper firmly against the bottle, a shell mounted on the bottle and surrounding the valve-casing, and means for closing the outer end of the shell, substantially as described.

2. In a device of the class described, the combination of a bottle provided at the top of its neck with exterior screw-threads, a metallic valve-casing extending upward from the neck of the bottle and provided at its lower end with interior and exterior screw-threads and engaging those of the bottle, a shell surrounding the valve-casing and provided at its lower end with interior screw-threads and engaging the exterior screw-threads of the said casing, a cork or stopper arranged within the valve-casing and resting upon the upper edge of the neck of the bottle to close the same, and means for holding the cork or stopper against the neck of the bottle, substantially as described.

3. In a device of the class described, the combination of a bottle provided at the top of its neck with exterior screw-threads and having a shoulder at the bottom thereof, a valve-casing screwing on the threaded portion of the bottle and consisting of a cylindrical lower portion and a conical upper portion, said valve-casing being provided at the screw-threads of the bottle with a perforation, a shell surrounding the valve-casing, screwing on the same and provided with a perforation adapted to register with that of the valve-casing, said perforations being adapted to receive a suitable cement or solder, whereby the shell in the casing is permanently secured to the neck of the bottle, a cork or stopper arranged within the valve-casing and fitting against the upper edge of the neck of the bottle, a ball arranged within the casing and located above the cork or stopper, and means for forcing the ball inward, substantially as and for the purpose described.

4. In a device of the class described, the combination of a bottle provided at the upper edge of its neck with a vertically-disposed annular flange forming a seat, a valve-casing secured to the neck and consisting of a cylindrical lower portion and a conical upper portion provided with perforations and having a threaded opening at its top, a cork or stopper arranged within the valve-casing, resting upon the annular flange and provided with radial guide-flanges, said cork or stopper having a central depression or concavity in its upper or outer face, a ball arranged within the casing and fitting in the concavity or depression, a screw arranged vertically in the threaded opening of the valve-casing in position for engaging the ball, and a shell surrounding the valve-casing, substantially as described.

In testimony that I claim the foregoing as my own I have hereto affixed my signature in the presence of two witnesses.

NICHOLAS LANSER.

Witnesses:
G. A. PRIMEL,
C. R. MESCHKEN.